US011071100B2

(12) United States Patent
Khoshnevisan et al.

(10) Patent No.: US 11,071,100 B2
(45) Date of Patent: Jul. 20, 2021

(54) TECHNIQUES AND APPARATUSES FOR TRANSMITTING DOWNLINK CONTROL INFORMATION (DCI) ON A PHYSICAL DOWNLINK SHARED CHANNEL (PDSCH)

(71) Applicant: QUALCOMM Incorporated, San Diego, CA (US)

(72) Inventors: Mostafa Khoshnevisan, San Diego, CA (US); Vinay Joseph, San Diego, CA (US); Farhad Meshkati, San Diego, CA (US); Alexandros Manolakos, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 16/460,772

(22) Filed: Jul. 2, 2019

(65) Prior Publication Data

US 2020/0015202 A1   Jan. 9, 2020

(30) Foreign Application Priority Data

Jul. 6, 2018   (GR) .............................. 20180100303

(51) Int. Cl.
*H04W 72/04* (2009.01)
*H04W 76/27* (2018.01)
*H04L 1/18* (2006.01)
*H04L 5/00* (2006.01)

(52) U.S. Cl.
CPC ......... *H04W 72/042* (2013.01); *H04L 1/1812* (2013.01); *H04L 5/0055* (2013.01); *H04W 76/27* (2018.02)

(58) Field of Classification Search
CPC ... H04W 72/042; H04W 76/22; H04W 76/27; H04L 5/0055; H04L 1/1812
See application file for complete search history.

(56) References Cited

U.S. PATENT DOCUMENTS

| 2015/0092563 | A1 | 4/2015 | Tabet et al. | |
| 2018/0014387 | A1* | 1/2018 | Bard | H05B 47/11 |
| 2018/0098250 | A1 | 4/2018 | Vrzic et al. | |
| 2018/0167915 | A1 | 6/2018 | Lee et al. | |
| 2018/0343653 | A1* | 11/2018 | Guo | H04L 5/0053 |
| 2019/0239212 | A1* | 8/2019 | Wang | H04L 5/0053 |

(Continued)

OTHER PUBLICATIONS

International Search Report and Written Opinion—PCT/US2019/040483—ISA/EPO—dated Nov. 12, 2019.

(Continued)

*Primary Examiner* — Wei Zhao
(74) *Attorney, Agent, or Firm* — Harrity & Harrity, LLP/Qualcomm

(57) ABSTRACT

Various aspects of the present disclosure generally relate to wireless communication. In some aspects, a base station may receive a capability indicator from a user equipment (UE) that indicates a capability of the UE to decode downlink control information (DCI) on a physical downlink shared channel (PDSCH). In some aspects, the base station may transmit, to the UE, the DCI on the PDSCH based at least in part on the capability indicator indicating that the UE can decode the DCI on the PDSCH. Numerous other aspects are provided.

42 Claims, 7 Drawing Sheets

(56) References Cited

U.S. PATENT DOCUMENTS

2019/0342907 A1\* 11/2019 Huang .................. H04L 5/0091

OTHER PUBLICATIONS

Qualcomm: "E-mail Discussions on 2-stage DCI for NR", 3GPP Draft; R1-1702629 E-mail Discussions on 2-stage DCI for NR, 3rd Generation Partnership Project (3GPP), Mobile Competence Centre, 650, Route Des Lucioles, F-06921, Sophia-Antipolis Cedex, France, vol. RAN WG1. No. Athens, Greece; Feb. 13, 2017-Feb. 17, 2017, Feb. 15, 2017, XP051222023, Retrieved from the Internet: URL:http://www.3gpp.org/ftp/tsg_ran/WG1_RL1/TSGR1_88/Docs/ [retrieved on Feb. 15, 2017], Sect.s 1, 3, 4, 12 pages.

\* cited by examiner

TECHNIQUES AND APPARATUSES FOR TRANSMITTING DOWNLINK CONTROL INFORMATION (DCI) ON A PHYSICAL DOWNLINK SHARED CHANNEL (PDSCH)

CROSS-REFERENCE TO RELATED APPLICATIONS UNDER 35 U.S.C. § 119

This application claims priority to Greek Patent Application No. 20180100303, filed on Jul. 6, 2018, entitled "TECHNIQUES AND APPARATUSES FOR TRANSMITTING DOWNLINK CONTROL INFORMATION (DCI) ON A PHYSICAL DOWNLINK SHARED CHANNEL (PDSCH)," which is hereby expressly incorporated by reference herein.

FIELD OF THE DISCLOSURE

Aspects of the present disclosure generally relate to wireless communication, and more particularly to techniques and apparatuses for transmitting downlink control information (DCI) on a physical downlink shared channel (PDSCH).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station (BS), may include receiving a capability indicator from a user equipment (UE) that indicates a capability of the UE to decode downlink control information (DCI) on a physical downlink shared channel (PDSCH). The method may include transmitting, to the UE, the DCI on the PDSCH based at least in part on the capability indicator indicating that the UE can decode the DCI on the PDSCH.

In some aspects, a base station for wireless communication may include memory and one or more processors operatively coupled to the memory. The memory and the one or more processors may be configured to receive a capability indicator from a user equipment (UE) that indicates a capability of the UE to decode downlink control information (DCI) on a physical downlink shared channel (PDSCH). The memory and the one or more processors may be configured to transmit, to the UE, the DCI on the PDSCH based at least in part on the capability indicator indicating that the UE can decode the DCI on the PDSCH.

In some aspects, a non-transitory computer-readable medium may store one or more instructions for wireless communication. The one or more instructions, when executed by one or more processors of a base station, may cause the one or more processors to receive a capability indicator from a user equipment (UE) that indicates a capability of the UE to decode downlink control information (DCI) on a physical downlink shared channel (PDSCH). The one or more instructions, when executed by the one or more processors, may cause the one or more processors to transmit, to the UE, the DCI on the PDSCH based at least in part on the capability indicator indicating that the UE can decode the DCI on the PDSCH.

In some aspects, an apparatus for wireless communication may include means for receiving a capability indicator from a user equipment (UE) that indicates a capability of the UE to decode downlink control information (DCI) on a physical downlink shared channel (PDSCH). The apparatus may include means for transmitting, to the UE, the DCI on the PDSCH based at least in part on the capability indicator indicating that the UE can decode the DCI on the PDSCH.

In some aspects, a method of wireless communication, performed by a user equipment (UE), may include transmitting, to a base station (BS), a capability indicator that indicates a capability of the UE to decode downlink control information (DCI) on a physical downlink shared channel (PDSCH). The method may include receiving, from the BS, the DCI on the PDSCH based at least in part on the capability indicator indicating that the UE can decode the DCI on the PDSCH.

In some aspects, a user equipment (UE) for wireless communication may include memory and one or more processors operatively coupled to the memory. The memory and the one or more processors may be configured to transmit, to a base station (BS), a capability indicator that indicates a capability of the UE to decode downlink control information (DCI) on a physical downlink shared channel (PDSCH). The memory and the one or more processors may be configured to receive, from the BS, the DCI on the PDSCH based at least in part on the capability indicator indicating that the UE can decode the DCI on the PDSCH.

In some aspects, a non-transitory computer-readable medium may store one or more instructions for wireless communication. The one or more instructions, when executed by one or more processors of a user equipment (UE), may cause the one or more processors to transmit, to a base station (BS), a capability indicator that indicates a capability of the UE to decode downlink control information (DCI) on a physical downlink shared channel (PDSCH). The one or more instructions, when executed by the one or more processors, may cause the one or more processors to receive, from the BS, the DCI on the PDSCH based at least in part on the capability indicator indicating that the UE can decode the DCI on the PDSCH.

In some aspects, an apparatus for wireless communication may include means for transmitting, to a base station (BS), a capability indicator that indicates a capability of the apparatus to decode downlink control information (DCI) on a physical downlink shared channel (PDSCH). The apparatus may include means for receiving, from the BS, the DCI on the PDSCH based at least in part on the capability indicator indicating that the apparatus can decode the DCI on the PDSCH.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
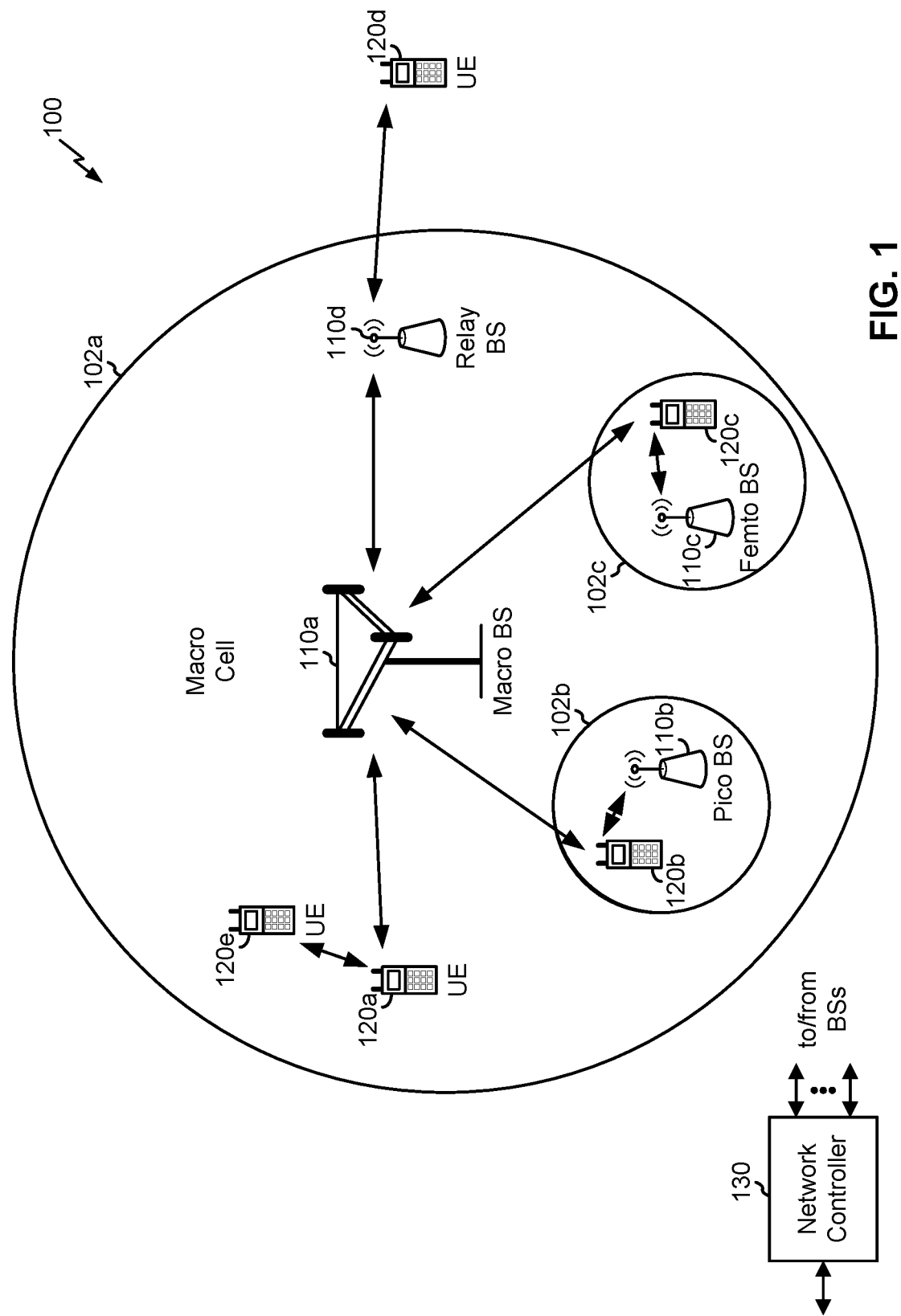
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
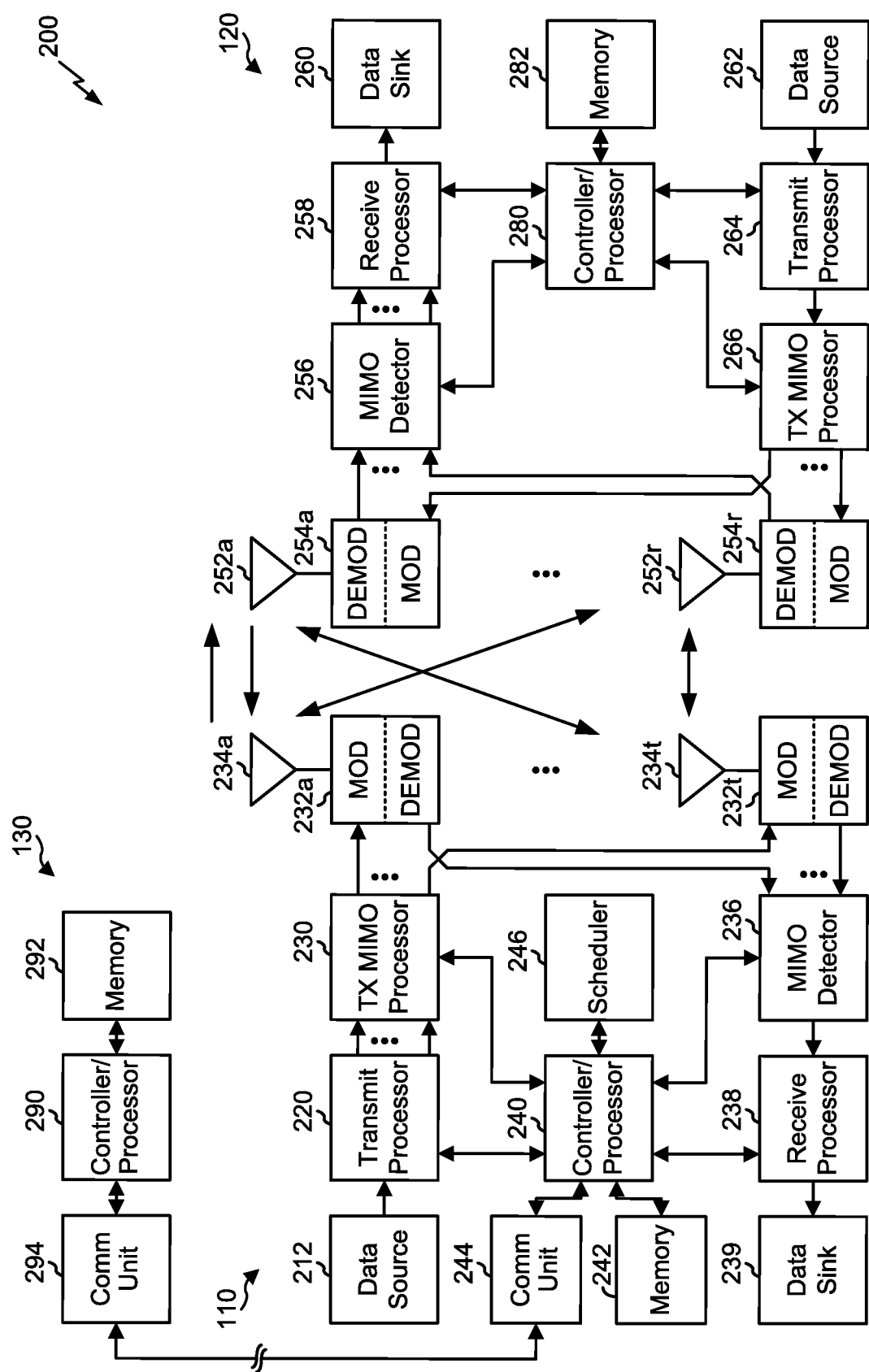
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmitting downlink control information (DCI) on a physical downlink shared channel (PDSCH), as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, base station 110 may include means for receiving a capability indicator from a user equipment (UE) that indicates a capability of the UE to decode downlink control information (DCI) on a physical downlink shared channel (PDSCH), means for transmitting, to the UE, the DCI on the PDSCH based at least in part on the capability indicator indicating that the UE can decode the DCI on the PDSCH, and/or the like. In some aspects, such means may include one or more components of base station 110 described in connection with FIG. 2.

In some aspects, UE 120 may include means for transmitting, to a base station (BS), a capability indicator that indicates a capability of the UE to decode downlink control information (DCI) on a physical downlink shared channel (PDSCH), means for receiving, from the BS, the DCI on the PDSCH based at least in part on the capability indicator indicating that the UE can decode the DCI on the PDSCH, and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3:
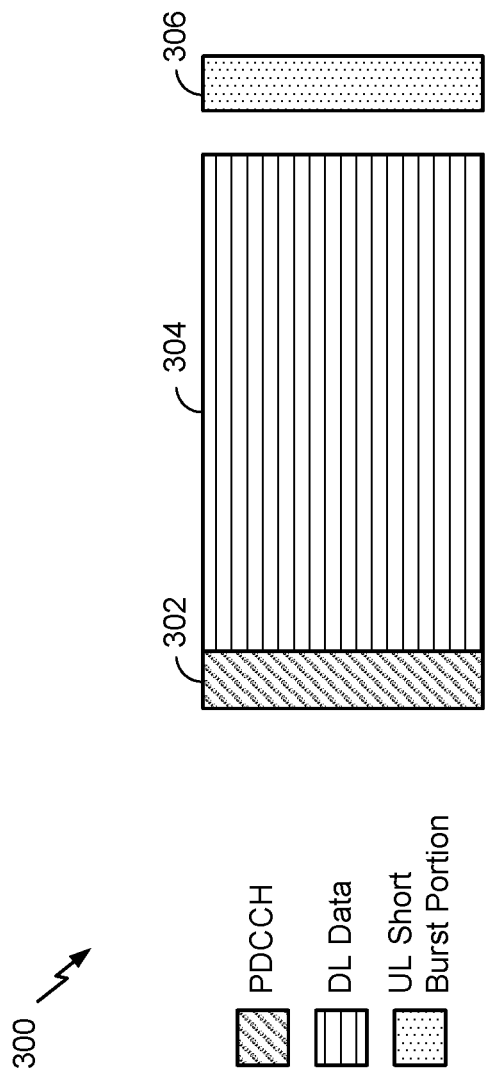
FIG. 3 is a diagram illustrating an example of a downlink (DL)-centric slot, in accordance with various aspects of the present disclosure.

FIG. 3 is a diagram 300 showing an example of a DL-centric slot or wireless communication structure. The DL-centric slot may include a control portion 302. The control portion 302 may exist in the initial or beginning portion of the DL-centric slot. The control portion 302 may include various scheduling information and/or control information corresponding to various portions of the DL-centric slot. In some configurations, the control portion 302 may be a physical DL control channel (PDCCH), as indicated in FIG. 3. In some aspects, the control portion 302 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 304. The DL data portion 304 may sometimes be referred to as the payload of the DL-centric slot. The DL data portion 304 may include the communication resources utilized to communicate DL data from the scheduling entity (e.g., UE or BS) to the subordinate entity (e.g., UE). In some configurations, the DL data portion 304 may be a physical DL shared channel (PDSCH).

The DL-centric slot may also include an UL short burst portion 306. The UL short burst portion 306 may sometimes be referred to as an UL burst, an UL burst portion, a common UL burst, a short burst, an UL short burst, a common UL short burst, a common UL short burst portion, and/or various other suitable terms. In some aspects, the UL short burst portion 306 may include one or more reference signals. Additionally, or alternatively, the UL short burst portion 306 may include feedback information corresponding to various other portions of the DL-centric slot. For example, the UL short burst portion 306 may include feedback information corresponding to the control portion 302 and/or the data portion 304. Non-limiting examples of information that may be included in the UL short burst portion 606 include an acknowledgement (ACK) signal (e.g., a physical uplink control channel (PUCCH) ACK, a physical uplink shared channel (PUSCH) ACK, an immediate ACK), a negative acknowledgement (NACK) signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 306 may include additional or alternative information, such as information pertaining to random access channel (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 3 is provided merely as an example. Other examples are possible and may differ from what was described with regard to FIG. 3.

Figure 4:
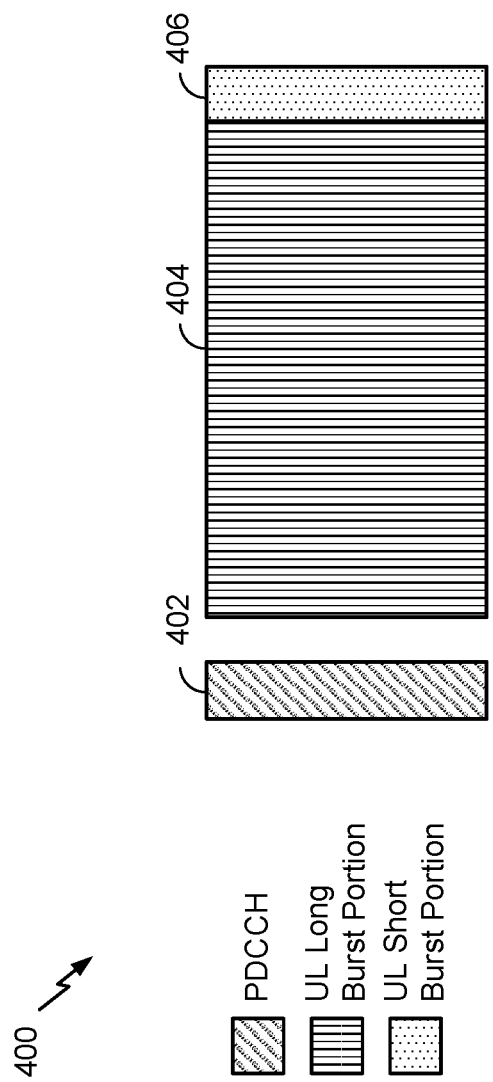
FIG. 4 is a diagram illustrating an example of an uplink (UL)-centric slot, in accordance with various aspects of the present disclosure.

FIG. 4 is a diagram 400 showing an example of an UL-centric slot or wireless communication structure. The UL-centric slot may include a control portion 402. The control portion 402 may exist in the initial or beginning portion of the UL-centric slot. The control portion 402 in FIG. 4 may be similar to the control portion 302 described above with reference to FIG. 3. The UL-centric slot may also include an UL long burst portion 404. The UL long burst portion 404 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 402 may be a physical DL control channel (PDCCH).

As illustrated in FIG. 4, the end of the control portion 402 may be separated in time from the beginning of the UL long burst portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 406. The UL short burst portion 406 in FIG. 4 may be similar to the UL short burst portion 306 described above with reference to FIG. 3, and may include any of the information described above in connection with FIG. 3. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 4 is provided merely as an example. Other examples are possible and may differ from what was described with regard to FIG. 4.

In LTE and NR, DCI is transmitted from a BS to a UE on PDCCH. For example, the DCI may include information that the UE needs to decode PDSCH and/or PUSCH transmissions, such as modulation and coding scheme (MCS)-related information, DL and/or UL resource assignments, redundancy versions, a new data indicator (NDI), and/or the like. A search space may be defined for the UE to decode PDCCH transmissions via blind decoding. For example, the search space may be based at least in part on a radio network temporary identifier (RNTI) (or cell-RNTI (C-RNTI) for a UE-specific search space), an aggregation level, a quantity of hypotheses for a given aggregation level, a slot number, a total quantity of control channel elements (CCEs), and/or the like.

This limits an amount of blind decoding that the UE may have to perform so that the UE does not have to perform decoding for a large quantity of possible search spaces. Based at least in part on this, PDCCH scheduling (e.g., assigning CCEs based at least in part on search space) has limited flexibility. For example, these features of PDCCH can result in blocking where, for example, a BS cannot assign a UE a PDCCH resource in a current slot when there are sufficient CCEs available in the current slot based at least in part on the remaining CCEs not being included in the UE's search space.

These limitations may prevent use of PDCCH in particular contexts. For example, in an ultra-reliable low latency communication (URLLC) context (e.g., in a factory automation context), there may be reliability and latency metrics that need to be satisfied, traffic may be deterministic, predictable, symmetric, and/or the like (e.g., one uplink packet and one downlink packet every one millisecond, three uplink packets and three downlink packets every 4 milliseconds, and/or the like), a packet size of traffic may be small (e.g., less than or equal to 40 bits), there may be a large quantity of UEs that need to be supported, coordinated multipoint (CoMP) and/or coordinated scheduling may be used to enhance reliability and/or system capacity, and/or the like. As a result, in a URLLC context, blocking probability may need to be reduced or eliminated in order to achieve high reliability (e.g., blocking on PDCCH may increase a latency for the UE because the next slot may be too late in time for the UE's needs).

In addition, in a URLLC context, a UE and/or a BS may need to use multi-user, multiple input, multiple output (MU-MIMO) and/or coherent CoMP for DCI. For example, when using MU-MIMO, such as to increase a reliability and/or a capacity of a network), UEs may be grouped into MU groups for simultaneous beamforming to multiple UEs with interference nulling. If this technique is used for PDCCH, then the multiple UEs may have to receive DCI on the same CCEs, and it is difficult to ensure that the multiple UEs have overlapping search space (e.g., due to different RNTIs, different aggregation levels, and/or the like).

Further, coordinated scheduling may be used in a URLLC context. Typically, coordinated scheduling across different cells is used on data channels (e.g., PDSCH and/or PUSCH) to efficiently manage inter-cell interference and/or to perform CoMP with UE-centric clustering. If this technique is used for PDCCH, a grouping that results from using the technique (e.g., a first UE associated with a first cell may share a set of CCEs with a second UE associated with a second cell but not with a third UE associated with a third cell to avoid interference) may not be feasible due to limitations in the search space of different UEs.

Some techniques and apparatuses described herein provide a base station that is capable of transmitting DCI on a PDSCH. For example, the DCI may be concatenated with a payload associated with the PDSCH (e.g., the DCI and a downlink shared channel (DSCH) of the PDSCH may be jointly encoded) and the BS may transmit the DCI on the PDSCH rather than (or, in some aspects, in addition to) on a PDCCH. This reduces or eliminates a blocking probability in the absence of limited search space per UE. In addition, this facilitates use of MU-MIMO, coherent CoMP, coordinated scheduling, and/or the like in association with transmitting DCI, which can improve a DCI transmission by providing capabilities that are not otherwise available or are limited when DCI is transmitted on the PDCCH. Further, this reduces or eliminates a need for a UE to perform blind decoding for multiple hypotheses, thereby conserving processing resources of the UE, reducing a complexity of decoding communications from a BS, conserving power resources of the UE, and/or the like.

Further, this reduces or eliminates cyclic redundancy check (CRC) overhead for DCI (e.g., which may be as much as 24 bits in NR), thereby conserving network resources used to provide the DCI from the BS to a UE. Further, this improves a coding gain of a UE as a result of a larger block length, thereby improving a reliability of communications between a UE and a BS. For example, information bits associated with DCI are typically small (e.g., between approximately 16 bits and 40 bits). If the information bits are transmitted as a separate packet (as in the case of DCI on PDCCH), coding gain is smaller than if the information bits are sent as part of a larger packet, such as on PDSCH. Further, this increases a frequency diversity of transmitting DCI by increasing a block length for a concatenated packet of DCI and downlink data (e.g., by causing the DCI to be allocated across a wider set of resource elements), thereby improving a transmission of DCI.

Figure 5:
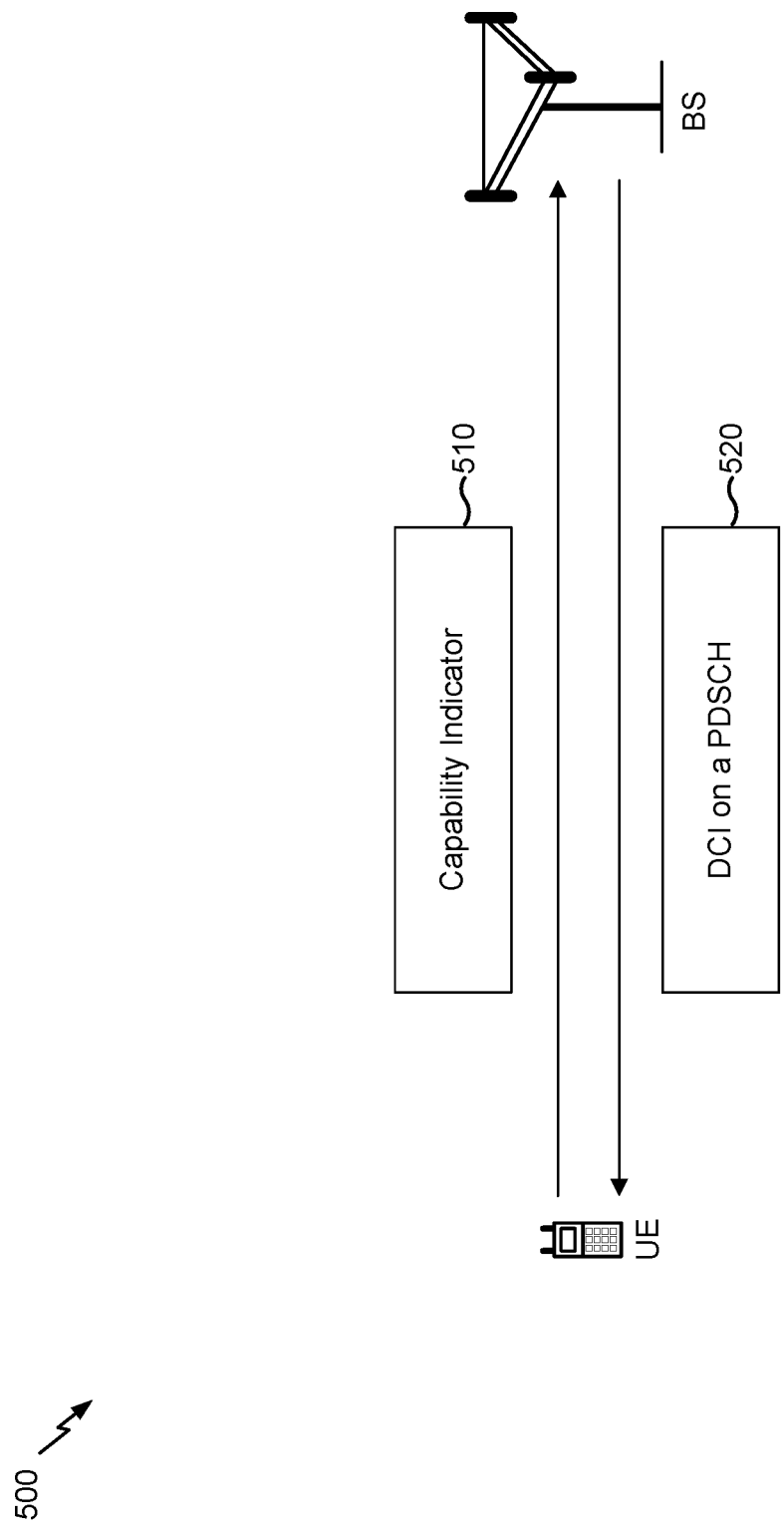
FIG. 5 is a diagram illustrating an example of transmitting downlink control information (DCI) on a physical downlink shared channel (PDSCH), in accordance with various aspects of the present disclosure.

FIG. 5 is a diagram illustrating an example 500 of transmitting DCI on a PDSCH, in accordance with various aspects of the present disclosure. As shown in FIG. 5, example 500 includes a UE (e.g., UE 120) and a BS (e.g., BS 110).

As shown in FIG. 5, and by reference number 510, the UE may transmit, and the BS may receive, a capability indicator. For example, the UE may transmit, and the BS may receive, the capability indicator when the UE attaches to a network, when the UE establishes a connection to the BS, based at least in part on receiving a request from the BS for the capability indicator, periodically, according to a schedule, and/or the like. In some aspects, the capability indicator may indicate a capability of the UE to decode DCI on a PDSCH. For example, the capability indicator may indicate that the UE is capable of decoding the DCI on the PDSCH, that the UE is incapable of decoding the DCI on the PDSCH, that the UE is capable of decoding the DCI on the PDCCH, and/or that the UE is capable of decoding the DCI on both the PDSCH and the PDCCH.

In some aspects, the BS may process the capability indicator to determine a capability of the UE to decode the DCI on the PDSCH (e.g., to determine whether the UE is capable of decoding the DCI on the PDSCH, whether the UE is capable of decoding the DCI on the PDCCH, whether the UE is capable of decoding the DCI on the PDSCH and the PDCCH, and/or the like). For example, the BS may process the capability indicator to identify a particular value that indicates that the UE is capable of decoding the DCI on the PDSCH or is not capable of decoding the DCI on the PDSCH, a particular value that indicates that the UE is capable of decoding the DCI on the PDCCH or is not capable of decoding the DCI on the PDCCH, and/or the like.

In some aspects, the BS may transmit, and the UE may receive, operation information that identifies a manner in which the UE is to operate with respect to decoding DCI. For example, the operation information may identify whether the UE is to decode the DCI on the PDSCH, whether the UE is to decode the DCI on the PDCCH, whether the UE is to decode the DCI on both the PDSCH and the PDCCH, and/or the like.

In some aspects, the BS may transmit the operation information based at least in part on the capability of the UE indicated by the capability indicator (e.g., the operation information may match the capability indicated by the capability indicator). In some aspects, the operation information may be transmitted to the UE through radio resource control (RRC) signaling.

In some aspects, the BS may transmit, and the UE may receive, configuration information. For example, the configuration information may identify a configuration of a length of bits for the DCI on the PDSCH (e.g., a location of the DCI in a payload associated with the PDSCH, a concatenation position of the DCI in the payload associated with the PDSCH, and/or the like). Continuing with the previous example, the configuration information may indicate that the DCI is included in the payload based at least in part on being selected from a fixed length of bits, included at a fixed position in bits transmitted in association with the PDSCH, selected from a set of fixed length values associated with the payload, and/or the like (e.g., the last 20 bits of the payload may be selected as the DCI, a particular 15 bits of the payload may be selected as the DCI, and/or the like). This provides the UE with information that the UE can use to identify DCI-related bits in PDSCH-related data after decoding a packet associated with the PDSCH-related data.

In some aspects, the configuration information may be transmitted to the UE via RRC signaling, via media access control control element (MAC CE) signaling, and/or the like. In some aspects, the BS may transmit the configuration information in association with transmitting the operation information.

As further shown in FIG. 5, and by reference number 520, the BS may transmit, and the UE may receive, DCI on a PDSCH. For example, the BS may transmit, and the UE may receive, the DCI on the PDSCH based at least in part on the capability indicator indicating that the UE can decode the DCI on the PDSCH. In some aspects, the BS may transmit, and the UE may receive, the DCI on the PDSCH via media access control control element (MAC CE) signaling.

In some aspects, the BS may transmit the DCI concatenated with a PDSCH transmission on the PDSCH. For example, the BS may concatenate the DCI with a payload of the PDSCH transmission and may encode the combined payload and DCI. In other words, the DCI and a downlink shared channel (DSCH) of the PDSCH may be jointly encoded. In some aspects, after encoding the combined payload and DCI, the BS may transmit the combined payload and DCI on the PDSCH as a PDSCH transmission. In some aspects, the DCI and the DSCH may be separately encoded prior to the BS transmitting the DCI on the PDSCH (e.g., DCI bits may not be concatenated with a PDSCH prior to encoding at the BS). In some aspects, the UE may jointly or separately decode the DCI and the DSCH depending on whether the DCI and the DSCH were jointly encoded or separately encoded.

In some aspects, the DCI may be associated with a subsequent PDSCH transmission of the PDSCH and/or a subsequent PUSCH transmission on a PUSCH. For example, when transmitting the DCI on the PDSCH, the BS may transmit the DCI at slot k, and the DCI may be associated with a PDSCH transmission and/or a PUSCH transmission to be transmitted in the next slot (e.g., slot k+1). This facilitates use of DCI on PDSCH in contexts that do not include burst-like traffic where an arrival of a next packet is not scheduled ahead of time. In some aspects, the DCI may be included in a fixed length of the PDSCH transmission, may be included in a set of fixed length values, and/or the like.

In some aspects, the DCI may not include common search space DCI. For example, the DCI may not include a slot format indicator (SFI), transmit power control (TCP)-related information, a preemption indicator (PI), and/or the like. In some aspects, the BS may transmit common search space DCI to the UE on a unicast PDSCH in association with transmitting the DCI on the PDSCH. For example, the BS may transmit common search space DCI to each UE separately. In some aspects, the BS may transmit common search space DCI to the UE on a broadcast PDSCH in association with transmitting the DCI on the PDSCH. For example, the BS may transmit the DCI in association with any broadcast downlink data on the PDSCH destined for the UE.

In some aspects, the BS may transmit multiple consecutive transmissions of the DCI. For example, the BS may transmit multiple consecutive transmissions of the DCI based at least in part on downlink data (e.g., downlink packets) having a packet size that satisfies a threshold. Continuing with the previous example, in this case, a transmission of each packet may need multiple downlink and/or uplink grants and consecutive transmissions of the DCI may be transmitted based on this. This conserves computing resources and/or power resources of the UE by reducing or eliminating a need for the UE to perform blind decoding when packet sizes associated with downlink data satisfies a threshold associated with multiple grants per packet.

In some aspects, the BS may receive, and the UE may transmit, a negative acknowledgement (NACK) after the UE experiences an error when decoding a PDSCH transmission that includes the DCI and the payload associated with the PDSCH transmission (e.g., an error that results in a loss of the payload, that results in a loss of a downlink and/or an uplink grant included in the DCI, and/or the like). In some aspects, the BS may transmit the DCI on the PDCCH based at least in part on receiving the NACK. For example, the UE may modify operations of the UE so that the UE decodes DCI on the PDCCH based at least in part on transmitting the NACK (e.g., may modify operations to blind decoding on the PDCCH based at least in part on failing to decode the PDSCH).

In some aspects, if the BS receives an acknowledgement (ACK) from the UE after transmitting the DCI on the PDCCH, the BS may return to transmitting DCI on the PDSCH. In some aspects, the UE may modify operations of the UE to return to decoding DCI on the PDSCH based at least in part on transmitting the ACK. This facilitates recovery by the UE and the BS from a PDSCH decoding error. In some aspects, the BS may transmit additional DCI (e.g., subsequent or next DCI for a subsequent or next PDSCH) based at least in part on receiving an ACK.

In some aspects, when the BS receives a NACK after transmitting the DCI on the PDSCH, the BS may retransmit a PDSCH transmission on the PDSCH in association with a hybrid automatic repeat request (HARD) process, and may transmit the DCI on a PDCCH. For example, the UE and the BS may modify respective operations so that the DCI is decoded on the PDCCH. Continuing with the previous example, the UE and the BS may modify respective operations so that the UE performs blind decoding to decode DCI corresponding to a PDSCH retransmission on the PDCCH.

Alternatively, the BS may transmit the DCI and additional DCI on the PDSCH at a first slot when transmitting the DCI on the PDSCH. For example, the DCI may be used at a second slot subsequent to the first slot if the UE successfully decodes the PDSCH at the first slot. For example, at slot k, the BS may transmit the DCI on a current PDSCH in association with downlink data, where the DCI is to be used at a next slot (e.g., slot k+1) if the UE successfully decodes the PDSCH at slot k. Continuing with the previous example, the additional DCI may be associated with a retransmission of the PDSCH at the second slot and/or may be used at a third slot subsequent to the second slot if decoding on the PDSCH at the second slot fails (e.g., the additional DCI may include DCI corresponding to a retransmission of the downlink transmission at slot k+1 to be used at slot k+2 if decoding of the PDSCH at slot k+1 fails). In this way, in case of a decoding failure at slot k+1, the UE already has the additional DCI for the retransmission of the PDSCH (e.g., which was received at slot k and will be used at slot k+2). This facilitates handling of a PDSCH retransmission and/or a HARQ process when transmitting the DCI on the PDSCH.

As indicated above, FIG. 5 is provided as an example. Other examples are possible and may differ from what was described with respect to FIG. 5.

Figure 6:
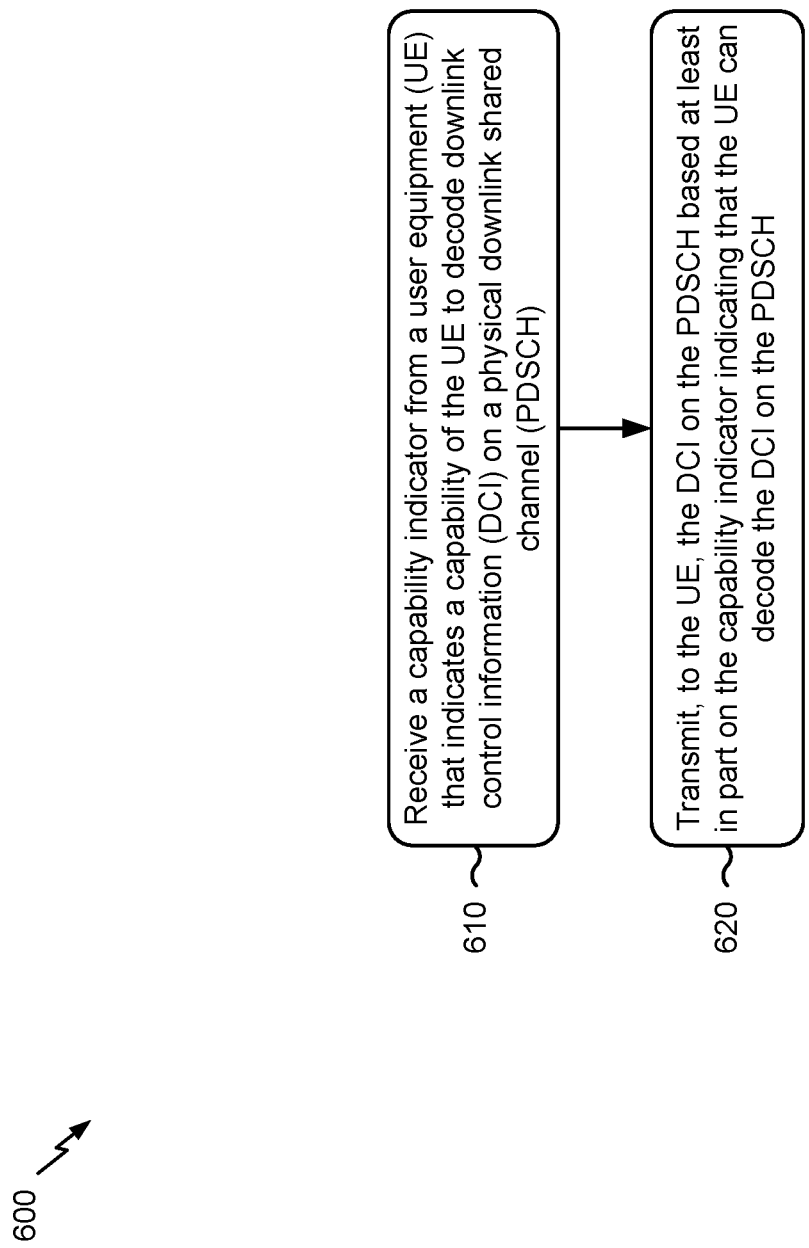
FIG. 6 is a diagram illustrating an example process performed, for example, by a base station, in accordance with various aspects of the present disclosure.

FIG. 6 is a diagram illustrating an example process 600 performed, for example, by a BS, in accordance with various aspects of the present disclosure. Example process 600 is an example where a BS (e.g., BS 110) performs transmission of DCI on a PDSCH.

As shown in FIG. 6, in some aspects, process 600 may include receiving a capability indicator from a user equipment (UE) that indicates a capability of the UE to decode downlink control information (DCI) on a physical downlink shared channel (PDSCH) (block 610). For example, the BS (e.g., BS 110 using antenna 234, DEMOD 232, MIMO detector 236, receive processor 238, controller/processor 240, and/or the like) may receive a capability indicator from a user equipment (UE) that indicates a capability of the UE to decode downlink control information (DCI) on a physical downlink shared channel (PDSCH), as described above.

As further shown in FIG. 6, in some aspects, process 600 may include transmitting, to the UE, the DCI on the PDSCH based at least in part on the capability indicator indicating that the UE can decode the DCI on the PDSCH (block 620). For example, the BS (e.g., BS 110 using controller/processor 240, transmit processor 220, TX MIMO processor 230, MOD 232, antenna 234, and/or the like) may transmit, to the UE, the DCI on the PDSCH based at least in part on the capability indicator indicating that the UE can decode the DCI on the PDSCH, as described above.

Process 600 may include additional aspects, such as any single aspect or any combination of aspects described below and/or in connection with one or more other processes described elsewhere herein.

In a first aspect, the DCI and a downlink shared channel (DSCH) of the PDSCH are jointly encoded or separately encoded, and transmitting the DCI includes transmitting the DCI and the DSCH on the PDSCH based at least in part on the DCI and the DSCH being jointly encoded or separately encoded.

In a second aspect, alone or in combination with the first aspect, the DCI is associated with a subsequent PDSCH transmission on the PDSCH or a subsequent physical uplink shared channel (PUSCH) transmission on a PUSCH.

In a third aspect, alone or in combination with one or more of the first and second aspects, process 600 includes receiving, from the UE, a negative acknowledgement (NACK) based at least in part on transmitting the DCI on the PDSCH, and transmitting the DCI on a physical downlink control channel (PDCCH) based at least in part on receiving the NACK.

In a fourth aspect, alone or in combination with one or more of the first through third aspects, process 600 includes receiving, from the UE, an acknowledgement (ACK) based at least in part on transmitting the DCI on the PDCCH, and transmitting subsequent DCI on the PDSCH based at least in part on receiving the ACK.

In a fifth aspect, alone or in combination with one or more of the first through fourth aspects, process 600 includes receiving, from the UE, a negative acknowledgement (NACK) based at least in part on transmitting the DCI on the PDSCH, transmitting the DCI on a physical downlink control channel (PDCCH), and retransmitting a PDSCH transmission on the PDSCH in association with a hybrid automatic repeat request (HARD) process.

In a sixth aspect, alone or in combination with one or more of the first through fifth aspects, transmitting the DCI on the PDSCH includes transmitting the DCI and additional DCI on the PDSCH at a first slot based at least in part on receiving the capability indicator.

In a seventh aspect, alone or in combination with one or more of the first through sixth aspects, a length of bits for the DCI is selected from at least one of a fixed length, or a set of fixed length values.

In an eighth aspect, alone or in combination with one or more of the first through seventh aspects, process 600 includes transmitting, to the UE, configuration information that identifies a configuration of the length of bits for the DCI after receiving the capability indicator, where the configuration information indicates a manner in which the UE is to identify the DCI on the PDSCH, and the configuration information is transmitted via radio resource control (RRC) signaling or media access control control element (MAC CE) signaling.

In a ninth aspect, alone or in combination with one or more of the first through eighth aspects, the capability indicator is associated with indicating that the UE is capable of at least one of decoding the DCI on the PDSCH, or decoding the DCI on a physical downlink control channel (PDCCH).

In a tenth aspect, alone or in combination with one or more of the first through ninth aspects, process 600 includes transmitting, to the UE, operation information that identifies whether the UE is to decode the DCI on the PDSCH, decode the DCI on a physical downlink control channel (PDCCH), or decode the DCI on both the PDSCH and the PDCCH based at least in part on receiving the capability indicator.

In an eleventh aspect, alone or in combination with one or more of the first through tenth aspects, process 600 includes transmitting common search space DCI to the UE on a unicast PDSCH in association with transmitting the DCI on the PDSCH.

In a twelfth aspect, alone or in combination with one or more of the first through eleventh aspects, process 600 includes transmitting common search space DCI to the UE on a broadcast PDSCH in association with transmitting the DCI on the PDSCH or in association with transmitting downlink data on the PDSCH.

In a thirteenth aspect, alone or in combination with one or more of the first through twelfth aspects, transmitting the DCI includes transmitting multiple consecutive transmissions of the DCI based at least in part on downlink data associated with the DCI having a packet size that satisfies a threshold.

In a fourteenth aspect, alone or in combination with one or more of the first through thirteenth aspects, transmitting the DCI includes transmitting the DCI on the PDSCH via media access control control element (MAC CE) signaling.

Although FIG. 6 shows example blocks of process 600, in some aspects, process 600 may include additional blocks, fewer blocks, different blocks, or differently arranged blocks than those depicted in FIG. 600. Additionally, or alternatively, two or more of the blocks of process 600 may be performed in parallel.

Figure 7:
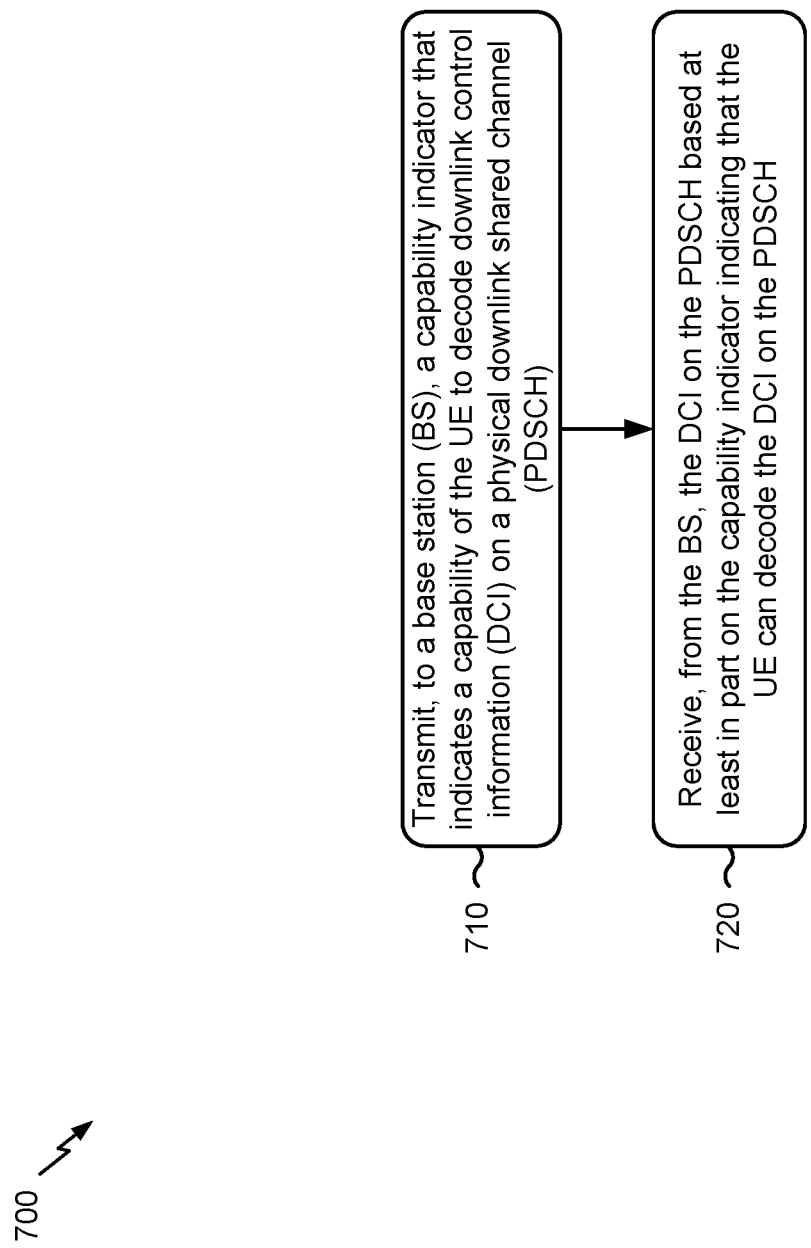
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120) performs transmission of DCI on a PDSCH.

As shown in FIG. 7, in some aspects, process 700 may include transmitting, to a base station (BS), a capability indicator that indicates a capability of the UE to decode downlink control information (DCI) on a physical downlink shared channel (PDSCH) (block 710). For example, the UE (e.g., UE 120 using controller/processor 280, transmit processor 264, TX MIMO processor 266, MOD 254, antenna 252, and/or the like) may transmit, to a base station (BS), a capability indicator that indicates a capability of the UE to decode downlink control information (DCI) on a physical downlink shared channel (PDSCH), as described above.

As further shown in FIG. 7, in some aspects, process 700 may include receiving, from the BS, the DCI on the PDSCH based at least in part on the capability indicator indicating that the UE can decode the DCI on the PDSCH (block 720). For example, the UE (e.g., UE 120 using antenna 252, DEMOD 254, MIMO detector 256, receive processor 258, controller/processor 280, and/or the like) may receive, from the BS, the DCI on the PDSCH based at least in part on the capability indicator indicating that the UE can decode the DCI on the PDSCH, as described above.

Process 700 may include additional aspects, such as any single aspect or any combination of aspects described below and/or in connection with one or more other processes described elsewhere herein.

In a first aspect, the DCI and a downlink shared channel (DSCH) of the PDSCH are jointly decoded or separately decoded, and receiving the DCI includes receiving the DCI and the DSCH on the PDSCH based at least in part on the DCI and the DSCH being jointly decoded or separately decoded.

In a second aspect, alone or in combination with the first aspect, the DCI is associated with a subsequent PDSCH transmission on the PDSCH or a subsequent physical uplink shared channel (PUSCH) transmission on a PUSCH.

In a third aspect, alone or in combination with one or more of the first and second aspects, process 700 includes transmitting, to the BS, a negative acknowledgement (NACK) in relation to receiving the DCI on the PDSCH, and receiving the DCI on a physical downlink control channel (PDCCH) based at least in part on transmitting the NACK.

In a fourth aspect, alone or in combination with one or more of the first through third aspects, process 700 includes transmitting, to the BS, an acknowledgement (ACK) based at least in part on receiving the DCI on the PDCCH, and receiving subsequent DCI on the PDSCH based at least in part on transmitting the ACK.

In a fifth aspect, alone or in combination with one or more of the first through fourth aspects, process 700 includes transmitting, to the BS, a negative acknowledgement (NACK) based in relation to receiving the DCI on the PDSCH, and based at least in part on transmitting the NACK, receiving the DCI on a physical downlink control channel (PDCCH), and receiving a retransmission of a PDSCH transmission on the PDSCH in association with a hybrid automatic repeat request (HARD) process.

In a sixth aspect, alone or in combination with one or more of the first through fifth aspects, receiving the DCI on the PDSCH includes receiving the DCI and additional DCI on the PDSCH at a first slot based at least in part on transmitting the capability indicator.

In a seventh aspect, alone or in combination with one or more of the first through sixth aspects, a length of bits for the DCI is selected from at least one of a fixed length, or a set of fixed length values.

In an eighth aspect, alone or in combination with one or more of the first through seventh aspects, process 700 includes receiving, from the BS, configuration information that identifies a configuration of the length of bits for the DCI after transmitting the capability indicator, where the configuration information indicates a manner in which the UE is to identify the DCI on the PDSCH, and the configuration information is transmitted via radio resource control (RRC) signaling or media access control control element (MAC CE) signaling.

In a ninth aspect, alone or in combination with one or more of the first through eighth aspects, the capability indicator is associated with indicating that the UE is capable of at least one of decoding the DCI on the PDSCH, or decoding the DCI on a physical downlink control channel (PDCCH).

In a tenth aspect, alone or in combination with one or more of the first through ninth aspects, process 700 may include receiving, from the BS, operation information that identifies whether the UE is to decode the DCI on the PDSCH, decode the DCI on a physical downlink control channel (PDCCH), or decode the DCI on both the PDSCH and the PDCCH based at least in part on transmitting the capability indicator.

In an eleventh aspect, alone or in combination with one or more of the first through tenth aspects, process 700 includes receiving common search space DCI from the BS on a unicast PDSCH in association with receiving the DCI on the PDSCH.

In a twelfth aspect, alone or in combination with one or more of the first through eleventh aspects, process 700 includes receiving common search space DCI from the BS on a broadcast PDSCH in association with receiving the DCI on the PDSCH or in association with receiving downlink data on the PDSCH.

In a thirteenth aspect, alone or in combination with one or more of the first through twelfth aspects, receiving the DCI includes receiving multiple consecutive transmissions of the DCI based at least in part on downlink data associated with the DCI having a packet size that satisfies a threshold.

In a fourteenth aspect, alone or in combination with one or more of the first through thirteenth aspects, receiving the DCI includes receiving the DCI on the PDSCH via media access control control element (MAC CE) signaling.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station (BS), comprising:
    receiving a capability indicator from a user equipment (UE) that indicates a capability of the UE to decode downlink control information (DCI) on a physical downlink shared channel (PDSCH), wherein the DCI and a downlink shared channel (DSCH) of the PDSCH are jointly encoded or separately encoded; and
    transmitting, to the UE, the DCI on the PDSCH based at least in part on the capability of the UE to decode the DCI on the PDSCH and based at least in part on the DCI and the DSCH being jointly encoded or separately encoded.

2. The method of claim 1, wherein the DCI is associated with a subsequent PDSCH transmission on the PDSCH or a subsequent physical uplink shared channel (PUSCH) transmission on a PUSCH.

3. The method of claim 1, further comprising:
    receiving, from the UE, a negative acknowledgement (NACK) based at least in part on transmitting the DCI on the PDSCH; and
    transmitting the DCI on a physical downlink control channel (PDCCH) based at least in part on receiving the NACK.

4. The method of claim 3, further comprising:
    receiving, from the UE, an acknowledgement (ACK) based at least in part on transmitting the DCI on the PDCCH; and
    transmitting subsequent DCI on the PDSCH based at least in part on receiving the ACK.

5. The method of claim 1, further comprising:
    receiving, from the UE, a negative acknowledgement (NACK) based at least in part on transmitting the DCI on the PDSCH; and
    based at least in part on receiving the NACK:
        transmitting the DCI on a physical downlink control channel (PDCCH), and
        retransmitting a PDSCH transmission on the PDSCH in association with a hybrid automatic repeat request (HARD) process.

6. The method of claim 1, wherein transmitting the DCI on the PDSCH comprises:
    transmitting the DCI and additional DCI on the PDSCH at a first slot based at least in part on receiving the capability indicator,
        wherein the DCI is to be used at a second slot subsequent to the first slot if the PDSCH is successfully decoded at the first slot,
        wherein the additional DCI is associated with a retransmission of the PDSCH at the second slot,
        wherein the additional DCI is to be used at a third slot subsequent to the second slot if decoding of the PDSCH at the second slot fails.

7. The method of claim 1, wherein a length of bits for the DCI is selected from at least one of:
    a fixed length, or
    a set of fixed length values.

8. The method of claim 7, further comprising:
    transmitting, to the UE, configuration information that identifies a configuration of the length of bits for the DCI after receiving the capability indicator,
        wherein the configuration information indicates a manner in which the UE is to identify the DCI on the PDSCH,
        wherein the configuration information is transmitted via radio resource control (RRC) signaling or media access control control element (MAC CE) signaling.

9. The method of claim 1, wherein the capability indicator is associated with indicating that the UE is capable of at least one of:
    decoding the DCI on the PDSCH, or
    decoding the DCI on a physical downlink control channel (PDCCH).

10. The method of claim 1, further comprising:
    transmitting, to the UE, operation information that identifies whether the UE is to decode the DCI on the PDSCH, decode the DCI on a physical downlink control channel (PDCCH), or decode the DCI on both the PDSCH and the PDCCH based at least in part on receiving the capability indicator.

11. The method of claim 1, further comprising:
    transmitting common search space DCI to the UE on a unicast PDSCH in association with transmitting the DCI on the PDSCH.

12. The method of claim 1, further comprising:
    transmitting common search space DCI to the UE on a broadcast PDSCH in association with transmitting the DCI on the PDSCH or in association with transmitting downlink data on the PDSCH.

13. The method of claim 1, wherein transmitting the DCI comprises:
    transmitting multiple consecutive transmissions of the DCI based at least in part on downlink data associated with the DCI having a packet size that satisfies a threshold.

14. The method of claim 1, wherein transmitting the DCI comprises:

transmitting the DCI on the PDSCH via media access control control element (MAC CE) signaling.

15. A method of wireless communication performed by a user equipment (UE), comprising:
transmitting, to a base station (BS), a capability indicator that indicates a capability of the UE to decode downlink control information (DCI) on a physical downlink shared channel (PDSCH), wherein the DCI and a downlink shared channel (DSCH) of the PDSCH are jointly encoded or separately encoded; and
receiving, from the BS, the DCI on the PDSCH based at least in part on the capability of the UE to decode the DCI on the PDSCH and based at least in part on the DCI and the DSCH being jointly encoded or separately encoded.

16. The method of claim 15, wherein the DCI is associated with a subsequent PDSCH transmission on the PDSCH or a subsequent physical uplink shared channel (PUSCH) transmission on a PUSCH.

17. The method of claim 15, further comprising:
transmitting, to the BS, a negative acknowledgement (NACK) in relation to receiving the DCI on the PDSCH; and
receiving the DCI on a physical downlink control channel (PDCCH) based at least in part on transmitting the NACK.

18. The method of claim 17, further comprising:
transmitting, to the BS, an acknowledgement (ACK) based at least in part on receiving the DCI on the PDCCH; and
receiving subsequent DCI on the PDSCH based at least in part on transmitting the ACK.

19. The method of claim 15, further comprising:
transmitting, to the BS, a negative acknowledgement (NACK) based in relation to receiving the DCI on the PDSCH; and
based at least in part on transmitting the NACK:
  receiving the DCI on a physical downlink control channel (PDCCH), and
  receiving a retransmission of a PDSCH transmission on the PDSCH in association with a hybrid automatic repeat request (HARD) process.

20. The method of claim 15, wherein receiving the DCI on the PDSCH comprises:
receiving the DCI and additional DCI on the PDSCH at a first slot based at least in part on transmitting the capability indicator,
  wherein the DCI is to be used at a second slot subsequent to the first slot if the PDSCH is successfully decoded at the first slot,
  wherein the additional DCI is associated with a retransmission of the PDSCH at the second slot,
  wherein the additional DCI is to be used at a third slot subsequent to the second slot if decoding of the PDSCH at the second slot fails.

21. The method of claim 15, wherein a length of bits for the DCI is selected from at least one of:
a fixed length, or
a set of fixed length values.

22. The method of claim 21, further comprising:
receiving, from the BS, configuration information that identifies a configuration of the length of bits for the DCI after transmitting the capability indicator,
  wherein the configuration information indicates a manner in which the UE is to identify the DCI on the PDSCH,
  wherein the configuration information is transmitted via radio resource control (RRC) signaling or media access control control element (MAC CE) signaling.

23. The method of claim 15, wherein the capability indicator is associated with indicating that the UE is capable of at least one of:
decoding the DCI on the PDSCH, or
decoding the DCI on a physical downlink control channel (PDCCH).

24. The method of claim 15, further comprising:
receiving, from the BS, operation information that identifies whether the UE is to decode the DCI on the PDSCH, decode the DCI on a physical downlink control channel (PDCCH), or decode the DCI on both the PDSCH and the PDCCH based at least in part on transmitting the capability indicator.

25. The method of claim 15, further comprising:
receiving common search space DCI from the BS on a unicast PDSCH in association with receiving the DCI on the PDSCH.

26. The method of claim 15, further comprising:
receiving common search space DCI from the BS on a broadcast PDSCH in association with receiving the DCI on the PDSCH or in association with receiving downlink data on the PDSCH.

27. The method of claim 15, wherein receiving the DCI comprises:
receiving multiple consecutive transmissions of the DCI based at least in part on downlink data associated with the DCI having a packet size that satisfies a threshold.

28. The method of claim 15, wherein receiving the DCI comprises:
receiving the DCI on the PDSCH via media access control control element (MAC CE) signaling.

29. A base station (BS) for wireless communication, comprising:
a memory; and
one or more processors operatively coupled to the memory, the memory and the one or more processors configured to:
  receive a capability indicator from a user equipment (UE) that indicates a capability of the UE to decode downlink control information (DCI) on a physical downlink shared channel (PDSCH), wherein the DCI and a downlink shared channel (DSCH) of the PDSCH are jointly encoded or separately encoded; and
  transmit, to the UE, the DCI on the PDSCH based at least in part on the capability of the UE to decode the DCI on the PDSCH and based at least in part on the DCI and the DSCH being jointly encoded or separately encoded.

30. The BS of claim 29, wherein the DCI is associated with a subsequent PDSCH transmission on the PDSCH or a subsequent physical uplink shared channel (PUSCH) transmission on a PUSCH.

31. The BS of claim 29, wherein the one or more processors, when transmitting the DCI on the PDSCH, are configured to:
transmit the DCI and additional DCI on the PDSCH at a first slot based at least in part on receiving the capability indicator,
  wherein the DCI is to be used at a second slot subsequent to the first slot if the PDSCH is successfully decoded at the first slot,
  wherein the additional DCI is associated with a retransmission of the PDSCH at the second slot, wherein the additional DCI is to be used at a third slot subsequent to the second slot if decoding of the PDSCH at the second slot fails.

32. The BS of claim 29, wherein the one or more processors are further configured to:
   transmit, to the UE, configuration information that identifies a configuration of a length of bits for the DCI after receiving the capability indicator,
      wherein the configuration information indicates a manner in which the UE is to identify the DCI on the PDSCH,
      wherein the configuration information is transmitted via radio resource control (RRC) signaling or media access control control element (MAC CE) signaling.

33. The BS of claim 29, wherein the one or more processors are further configured to:
   transmit, to the UE, operation information that identifies whether the UE is to decode the DCI on the PDSCH, decode the DCI on a physical downlink control channel (PDCCH), or decode the DCI on both the PDSCH and the PDCCH based at least in part on receiving the capability indicator.

34. A user equipment (UE) for wireless communication, comprising:
   a memory; and
   one or more processors operatively coupled to the memory, the memory and the one or more processors configured to:
      transmit, to a base station (BS), a capability indicator that indicates a capability of the UE to decode downlink control information (DCI) on a physical downlink shared channel (PDSCH), wherein the DCI and a downlink shared channel (DSCH) of the PDSCH are jointly encoded or separately encoded; and
      receive, from the BS, the DCI on the PDSCH based at least in part on the capability of the UE to decode the DCI on the PDSCH and based at least in part on the DCI and the DSCH being jointly encoded or separately encoded.

35. The UE of claim 34, wherein the DCI is associated with a subsequent PDSCH transmission on the PDSCH or a subsequent physical uplink shared channel (PUSCH) transmission on a PUSCH.

36. The UE of claim 34, wherein the one or more processors, when receiving the DCI on the PDSCH, are configured to:
   receive the DCI and additional DCI on the PDSCH at a first slot based at least in part on transmitting the capability indicator,
      wherein the DCI is to be used at a second slot subsequent to the first slot if the PDSCH is successfully decoded at the first slot,
      wherein the additional DCI is associated with a retransmission of the PDSCH at the second slot,
      wherein the additional DCI is to be used at a third slot subsequent to the second slot if decoding of the PDSCH at the second slot fails.

37. The UE of claim 34, wherein the one or more processors are further configured to:
   receive, from the BS, configuration information that identifies a configuration of a length of bits for the DCI after transmitting the capability indicator,
      wherein the configuration information indicates a manner in which the UE is to identify the DCI on the PDSCH,
      wherein the configuration information is transmitted via radio resource control (RRC) signaling or media access control control element (MAC CE) signaling.

38. The UE of claim 34, wherein the one or more processors are further configured to:
   receive, from the BS, operation information that identifies whether the UE is to decode the DCI on the PDSCH, decode the DCI on a physical downlink control channel (PDCCH), or decode the DCI on both the PDSCH and the PDCCH based at least in part on transmitting the capability indicator.

39. The UE of claim 34, wherein the one or more processors are further configured to:
   transmit, to the BS, a negative acknowledgement (NACK) in relation to receiving the DCI on the PDSCH.

40. The UE of claim 39, wherein the one or more processors are further configured to:
   receive the DCI on a physical downlink control channel (PDCCH) based at least in part on transmitting the NACK.

41. The BS of claim 29, wherein the one or more processors are further configured to:
   receive, from the UE, a negative acknowledgement (NACK) based at least in part on transmitting the DCI on the PDSCH.

42. The BS of claim 41, wherein the one or more processors are further configured to:
   transmit the DCI on a physical downlink control channel (PDCCH) based at least in part on receiving the NACK.

* * * * *